United States Patent
Won et al.

(10) Patent No.: US 6,800,120 B1
(45) Date of Patent: Oct. 5, 2004

(54) SPLIT-FLOW PROCESS AND APPARATUS

(75) Inventors: Ray Won, San Clemente, CA (US); Peter Condorelli, Irvine, CA (US); Jeffrey Scherffius, Laguna Hills, CA (US); Carl L. Mariz, Irvine, CA (US)

(73) Assignee: Fluor Corporation, Aliso Viejo, CA (US)

( * ) Notice: Subject to any disclaimer, the term of this patent is extended or adjusted under 35 U.S.C. 154(b) by 0 days.

(21) Appl. No.: 10/659,450

(22) Filed: Dec. 30, 2003

Related U.S. Application Data

(62) Division of application No. 09/831,582, filed as application No. PCT/US99/27714 on Nov. 22, 1999, now Pat. No. 6,645,446.
(60) Provisional application No. 60/109,613, filed on Nov. 23, 1998.

(51) Int. Cl.$^7$ .............................................. B01D 53/14
(52) U.S. Cl. ........................... 96/234; 96/242; 422/235
(58) Field of Search ................................ 423/228, 229; 422/235; 96/234, 242; 95/168, 181, 183, 235, 236, 160, 161, 162, 163, 165, 167, 169

(56) References Cited

U.S. PATENT DOCUMENTS

| | | | | |
|---|---|---|---|---|
| 2,437,288 A | * | 3/1948 | Anderson .................... | 423/229 |
| 3,851,041 A | | 11/1974 | Eickmeyer .................. | 423/223 |
| 3,962,404 A | * | 6/1976 | Giammarco et al. ........ | 423/222 |
| 4,073,863 A | * | 2/1978 | Giammarco et al. ........ | 423/222 |
| 4,146,569 A | * | 3/1979 | Giammarco et al. ........ | 423/222 |
| 4,248,608 A | * | 2/1981 | Giammarco et al. .......... | 95/158 |
| 4,271,132 A | | 6/1981 | Eickmeyer .................. | 124/413 |
| 4,702,898 A | * | 10/1987 | Grover ........................ | 423/220 |
| 5,667,561 A | * | 9/1997 | Suzuki et al. ................. | 95/139 |
| 6,497,852 B2 | * | 12/2002 | Chakravarti et al. ........ | 423/228 |

* cited by examiner

*Primary Examiner*—Duane S. Smith
(74) *Attorney, Agent, or Firm*—Rutan & Tucker, LLP

(57) ABSTRACT

A recovery plant for recovery of a gaseous component from a process gas has an absorber employing a lean solvent and a semi-lean solvent that absorb the gaseous component from the process gas, thereby producing a rich solvent, a semi-rich solvent, and a lean process gas. A regenerator extracts the gaseous component from the rich solvent, thereby regenerating the lean solvent and the semi-lean solvent. A solvent flow control element combines at least part of the semi-rich solvent and the semi-lean solvent to form a mixed solvent, and a cooler cools the mixed solvent that is subsequently fed into the absorber. In a method of removing a gaseous component from a process gas, a stream of lean solvent and a stream of semi-lean solvent are provided. In another step, the stream of lean solvent and the stream of semi-lean solvent contact the process gas in an absorber to produce a stream of semi-rich solvent and rich solvent. In a further step, at least part of the stream of semi-rich solvent and semi-lean solvent are combined to form a mixed solvent stream, and a cooler cools the mixed solvent stream, which is introduced into the absorber to absorb the gaseous component.

13 Claims, 2 Drawing Sheets

SPLIT-FLOW PROCESS AND APPARATUS

This application is a divisional application of previously allowed U.S. application with the Ser. No. 09/831,582 filed Aug. 21, 2001, now U.S. Pat. No. 6,645,446, which is a 371 of PCT/US99/27714, filed Nov. 22, 1999 and also claims the benefit of U.S. provisional application No. 60/109,613 filed on Nov. 23, 1998 which is incorporated herein by reference.

FIELD OF THE INVENTION

The field of the invention is removal of a gaseous component from a process gas.

BACKGROUND OF THE INVENTION

Various methods are known in the art to remove a gaseous component from a stream of a process gas, including a wide range of distillation-, adsorption-and absorption processes, and one relatively common process involves regenerator-absorber systems.

In a typical regenerator-absorber system, gas is introduced in the absorber where the gas contacts a lean solvent traveling down the column. The gaseous component is at least partially absorbed by the lean solvent, and the purified process gas leaves the absorber for further processing or discharge. The lean solvent containing the gaseous component (i.e. the rich solvent) flows through a cross heat exchanger thereby increasing its temperature. The heated rich solvent is then stripped at low pressure in a regenerator. The stripped solvent (i.e. lean solvent) is sent back through the cross heat exchanger to reduce the temperature in the lean solvent before completing the loop back to the absorber. The regenerator-absorber system process typically allows continuous operation of removal of a gaseous compound from a process gas at relatively low cost. However, the efficiency of removal of the gaseous component is not always satisfactory, and especially when the gaseous component is carbon dioxide, stringent emission standards can often not be achieved with a standard regenerator-absorber system. To overcome problems with low efficiency the temperature or pressure in the regenerator may be increased. However, corrosivity and solvent degradation generally limit the degree of optimization for this process.

An improved regenerator-absorber system is shown by Shoeld in U.S. Pat. No. 1,971,798 that comprises a split-loop absorption cycle, in which the bulk of the solvent is removed from an intermediate stage of the regenerator column and recycled to an intermediate stage of the absorber. In this arrangement only a small portion of the solvent is stripped to the lowest concentration, and a high vapor to liquid ratio for stripping is achieved in the bottom trays of the absorber, resulting in somewhat lower energy use at low outlet concentrations. However, the reduction in energy use is relatively low due to thermodynamic inefficiencies in stripping, mainly because of variations in the solvent composition as it circulates within the split loop.

To circumvent at least some of the problems with the split loop process, various improvements have been made. For example, one improvement to the split-loop process is to more accurately control the concentration of solvents. To more accurately control the solvent concentrations, two modifications are generally necessary. The first modification comprises an intermediate reboiler, which is installed to a main regenerator to boil off water from the semi-lean solvent to adjust the concentration of the semi-lean solvent stream to the concentration of the lean solvent. The second modification comprises a side-regenerator to regenerate condensate from the main regenerator. The condensate from the main regenerator is sent to the top section of the main regenerator, where it undergoes partial stripping, and is then further stripped to a very low concentration of dissolved gas in the side-regenerator, before being returned to the bottom reboiler of the main regenerator.

Since only a relatively small portion of the total solvent (typically ~20%) is stripped to the ultra-low concentration, the process allows achieving relatively low outlet concentrations with comparably low energy use. Furthermore, when methyl diethanolarnine (MDEA) is employed as a solvent in the improved split-loop process, the liquid circulation can be reduced by about 20%. However, the modifications to improve energy use and lower solvent circulation generally require a substantial modification in the configuration of the main regenerator, and the installation of a side-regenerator, both of which may result in substantial costs and significant down-time of an existing absorber-regenerator system.

Another improvement to the split-loop process is described by Shethna and Towler ["Gas Sweetening to Ultra-low Concentrations using Alkanolamines Absorption"; Paper 46f, AlChE Spring Meeting, N.O. 1996], in which two regenerator columns are utilized. A primary regenerator produces a semi-lean solvent, and a secondary regenerator produces an ultra-lean solvent. A small portion of the purified process gas leaving the absorber is expanded to a lower pressure level thereby producing a cooled purified process gas. The heated ultra-lean solvent stream leaving the secondary regenerator is cooled by the cooled purified process gas thereby producing a heated purified process gas, which is subsequently fed into the secondary regenerator. The recycled gas is then recovered from the secondary regenerator and reintroduced into the feed gas stream at the absorber.

The use of a substitute vapor instead of a reboiled solvent at the secondary regenerator advantageously lowers the partial pressure of the solvent vapor in the secondary regenerator, and allows the secondary regenerator to operate a lower temperature than the primary regenerator column. Operating the secondary regenerator at a reduced temperature typically results in a reduced corrosivity of the solvent, which in turn may allow for the use of cheaper materials such as carbon steel in place of the conventional stainless steel. Furthermore, a split-loop process using vapor substitution may be combined with fixed-bed irreversible absorption technology, e.g. to remove $H_2S$ and or COS from the recycle gas in a bed of solid sorbent, thereby ensuring a relatively long bed life of the absorber. However, the split-loop process using vapor substitution requires the use of least two regenerator columns, and it may further be necessary to re-tray the top stages of an existing absorber to accommodate for the needs of this particular process. Moreover, due to the recycle gas and the use of a secondary regenerator column, retrofitting of existing absorber-regenerator combinations may be relatively expensive and time consuming.

Although various improvements to the general layout of a absorber-regenerator process have been known in the art, all or almost all of them suffer from one or more than one disadvantage. Therefore, there is a need to provide improved methods and apparatus for the removal of a gaseous component from process gases.

SUMMARY OF THE INVENTION

The present invention is directed to a recovery plant to recover a gaseous component from a process gas, having an absorber that employs a lean solvent and a semi-lean solvent which absorb the gaseous component from the process gas, thereby producing a rich solvent, a semi-rich solvent, and a lean process gas. A regenerator is coupled to the absorber, wherein the regenerator extracts the gaseous component from the rich solvent, thereby regenerating the lean solvent and the semi-lean solvent. A solvent flow control element is coupled to the absorber and combines at least part of the semi-rich solvent with at least part of the semi-lean solvent to form a mixed solvent. A cooler is coupled to the absorber that cools the mixed solvent, and the cooled mixed solvent is subsequently fed into the absorber via a connecting element.

In one aspect of the inventive subject matter, the process gas is a flue gas from a combustion turbine, having a pressure of less than 20 psia when fed into the absorber, and wherein the gaseous component is carbon dioxide. The concentration of carbon dioxide is preferably greater than 2 mole %, more preferably greater than 5 mole %, and most preferably greater than 10 mole %.

In another aspect of the inventive subject matter, the solvent comprises a chemical solvent, preferably selected from the group consisting of monoethanolarnine, diethanolamine, diglycolamine, and methyldiethanolamine. It is also preferred that appropriate solvents have a concave equilibrium curve.

In a further aspect of the inventive subject matter, a method of removing a gaseous component from a process gas has a first step in which a stream of lean solvent and a stream of semi-lean solvent is provided. In a second step, the process gas is contacted with the stream of lean solvent and semi-lean solvent in an absorber to produce a stream of semi-rich solvent and a stream of rich solvent. In a further step, at least part of the semi-rich solvent and at least part of the semi-lean solvent are combined to form a mixed solvent stream, in a still further step the mixed solvent stream is cooled and the cooled mixed solvent stream is introduced into the absorber to absorb the gaseous component.

Various objects, features, aspects and advantages of the present invention will become more apparent from the following detailed description of preferred embodiments of the invention, along with the accompanying drawings in which like numerals represent like components.

DETAILED DESCRIPTION

As used herein, the term "absorber" refers to an apparatus in which significant amounts of at least one gaseous compound are removed from a mixture of gaseous compounds, and that contains, when in operation, a solvent that is substantially selective towards the compound. The term "substantially selective" means that the solvent absorbs the compound to a significant higher degree (i.e., >20%) than the other compounds present in the mixture of gaseous compounds. The solvent with the highest concentration of the absorbed gaseous compound leaving the absorber is termed "rich solvent", while the solvent with the lowest concentration of the absorbed gaseous compound leaving the regenerator is termed "lean solvent". The term "semi-lean solvent" refers to the solvent leaving the regenerator, which has a higher concentration of the absorbed gaseous compound than the lean solvent. The solvent that leaves the absorber having a lower concentration of the absorbed compound than the rich solvent is termed "semi-rich solvent".

As also used herein, the term "regenerator" refers to an apparatus in which an absorbed gaseous compound is at least partially removed from a rich solvent under elevated temperatures of about 110° C. to about 130° C.

Figure 1:
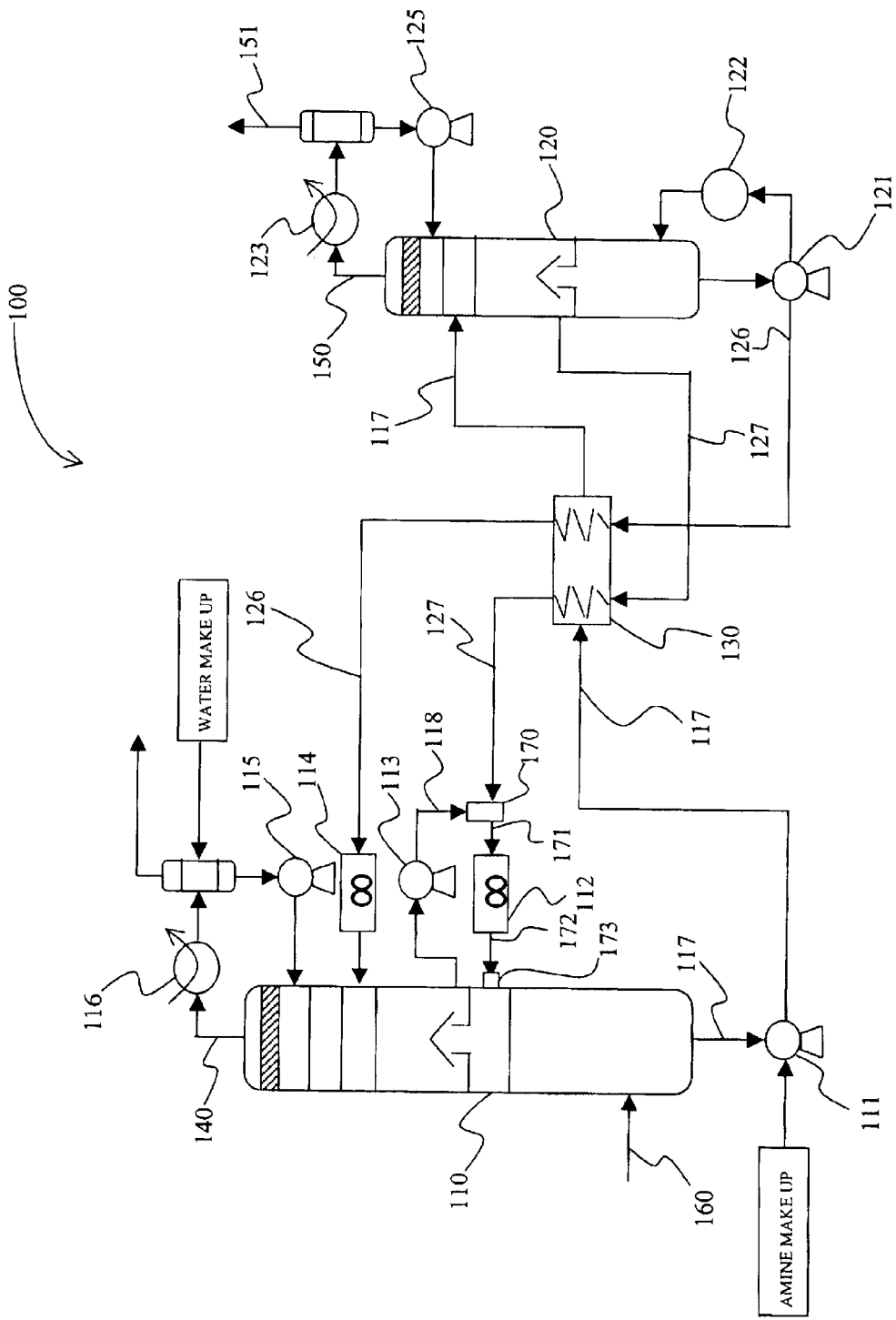
FIG. 1 is a schematic of an improved $CO_2$ removal plant according to the inventive subject matter.

In FIG. 1, a recovery plant 100 has an absorber 110 and a regenerator 120. A stream of process gas 160 comprising a gaseous component enters the absorber, and a stream of rich solvent 117 leaves the absorber via rich solvent pump 111. The stream of rich solvent is heated in the cross heat exchanger 130 and enters the regenerator 120. The gaseous component is carbon dioxide and is removed from the rich solvent in two different locations, whereby a semi-lean solvent stream 127 is generated at a position higher that a lean solvent stream 126. Part of the lean solvent stream 126 is redirected via the lean solvent pump 121 to the bottom reboiler 122, and enters again the regenerator 120. The gaseous compound leaves the regenerator in a stream of gaseous compound 150, while carried over solvent is recovered and recycled from the stream of gaseous compound via condenser 123 and condenser pump 125. Both the lean solvent stream and the semi-lean solvent stream are cooled in the cross heat exchanger 130, and the lean solvent stream 126 is further cooled via additional cooler 114 before entering the absorber 110. The semi-lean solvent stream 127 is mixed in the solvent flow control element 170 with semi-rich solvent stream 118, which is delivered from the absorber 110 via semi-rich solvent stream pump 113. A mixed solvent stream 171 is further cooled via cooler 112, and cooled mixed solvent stream 172 enters the absorber via the connecting element 173 at a lower position than the lean solvent stream. A stream of lean process gas 140 leaves the absorber 110 via the condenser 116, and a condenser pump 115 pumps the condensate liquid back to the absorber.

In a preferred embodiment, the absorber 110 in carbon dioxide removal plant 100 is a random packed-bed absorber with a diameter of about 20 ft and a height of approximately 70 ft, configured to process about 30 million standard cubic feet process gas per hour. The regenerator 120 is a standard regenerator with a diameter of about 10 ft, and a height of approximately 50 ft, generating a stream of carbon dioxide 150. Process gas 160 is flue gas from a combustion turbine with a carbon dioxide content of about 13 mole % having a pressure of about 2 psig when fed into tho absorber, and the lean process gas 140 has a carbon dioxide content of about 3 mole %. The solvent in all solvent streams is monoethanolamine, which absorbs the gaseous component carbon dioxide. The lean solvent stream 126 has a carbon dioxide loading of less than 0.25, while the carbon dioxide loading in the semi-lean solvent stream 127 is approximately 0.4. The rich solvent stream 117 has a carbon dioxide loading of about 0.5, and the semi-rich solvent stream 118 has a carbon dioxide loading of greater than 0.3. The rich solvent stream 117 is heated in a standard cross heat exchanger 130 before entering the regenerator, and both the lean solvent stream and the semilean solvent stream are cooled in the cross heat exchanger. The solvent flow control element 170 is a static mixer with two inlet ports, and one outlet port through which the mixed solvent stream 171 exits the solvent flow control element. Cooler 112 and 114 are standard side coolers with water as a coolant or air coolers. Cooled mixed solvent stream 172 is approximately 20° C.

cooler than the mixed solvent stream 171, and is fed into the absorber via a line 173. The steam operated reboiler 122 reheats a portion of the lean solvent stream 121 before recirculating the lean solvent stream into the regenerator. The pumps 111, 113, 115, 121, and 125, condensers 116 and 123, and all lines are standard elements in plant for treatment of industrial gases, and well known to the art.

In alternative aspects of the inventive subject matter, the absorber need not be limited to a random packed-bed absorber with a diameter of about 20 ft and a height of approximately 70 ft, configured to process about 30 million standard cubic feet per hour, but may include various alternative types, sizes, and capacities. For example, where reduced cost of material is desirable, contemplated absorbers may include structured packed-bed absorbers, while in applications that include crude process gases, or gases with a relatively high degree of impurities, a trayed-type absorber may be employed. Similarly, where relatively large capacities of process gas are to be purified, multiple absorbers with same or different capacity may be utilized. Contemplated process gas capacities include flow rates of between 1–50 million standard cubic feet per hour (NIMSCF/hr), however larger flow rates between 50–100 MMSCF/hr are also contemplated. Where smaller quantities of process gas are to be purified, flow rates of between 0.1–50 MMSCF/hr and less are contemplated. Consequently, the size of appropriate absorbers may vary from 1 to 30 ft in diameter, and the height may vary between 50 and 100 ft.

With respect to the process gas 160, it is contemplated that various gases other than a flue gas from a combustion turbine with a carbon dioxide content of about 13 mole % are also appropriate. For example, depending on the fuel source and combustion process, the carbon dioxide content may vary between less than 3 mole % and more than 20 mole %. Therefore, the carbon dioxide content may be greater than 2 mole %, greater than 5 mole %, and greater than 10 mole %. It should further be appreciated that gases other than flue gases from a combustion turbine are also contemplated, including natural gas, various refinery gases, or steam reformer gases, all of which may or may not be pretreated. Contemplated pretreatment may thereby include fractionation, filtration, scrubbing, and combination or dilution with other gases. It is further contemplated that the pressure of the process gas need not be limited to 2 psig when fed into the absorber, but may exhibit higher pressures. Contemplated higher pressures include pressures of less than about 20 psia, less than 50 psia, less than 150 psia, and less than 300 psia.

It is also contemplated that the solvent in all of the solvent streams need not be limited to monoethanolamine (MEA), but may comprise various alternative solvents, including physical and chemical solvents, and any reasonable combination thereof For example, physical solvents include SELEXOL™ (a dimethyl ether of polyethylene glycol) and methanol, while chemical solvents include organic amines and mixed amines. Especially contemplated chemical solvents are MEA, diethanolamine, diglycolamine, and methyldiethanolarnine. It should further be appreciated that co-solvents in combination with contemplated solvent are also appropriate. Furthermore, contemplated solvents may further comprise additives, including anti-oxidants, corrosion inhibitors, and anti-foam agents. With respect to the carbon dioxide loading of the various solvents it should be appreciated that the carbon dioxide loading may vary in the various solvents predominantly depending on the carbon dioxide content of the process gas. Therefore, the data given for the lean solvent stream, the semi-lean solvent stream, the semi-rich solvent stream, and the rich solvent stream are not intended to be limiting.

Furthermore, depending on the nature of the process gas and the physico-chemical properties of the solvent, the stream of the gaseous compound 150 is not limited to carbon dioxide, but may include hydrogen sulfide, nitrogen, oxygen, hydrogen, helium, etc.

In further alternative aspects of the inventive subject matter, the regenerator may include various regenerators other than a standard regenerator with a diameter of about 10 ft, and a height of approximately 50 ft. For example, where relatively low amounts of process gas are purified, smaller regenerators may be sufficient, whereas for the purification of relatively high amounts of process gas a single larger regenerator or multiple regenerators are contemplated. In general, the regenerator is not limited in size or number so long as appropriate regenerators regenerate sufficient amounts of lean and semi-lean solvent streams, and liberate the gaseous compound. Likewise, the reboiler 122 is not restricted to a steam operated reboiler, but may also be alternative reboilers, including oil-heated, or flame heated, or electrically heated reboilers.

With respect to the heating of the rich solvent stream 117 and cooling of the lean solvent stream 126 and semi-lean solvent stream 127 it is contemplated that various devices other than a cross heat exchanger are also appropriate. For example, the rich solvent stream 117 may be heated utilizing residual heat from the steam reboiler, or from heat sources other than a heat exchanger, including hot fluids, hot gases, and electricity. It is especially contemplated that the heated rich solvent stream is fed to the top of the regenerator in a single solvent stream, however, alternative configurations are also contemplated. Appropriate configurations include feeding the heated rich solvent at one or more than one point at the side of the regenerator.

Similarly, the cooling of the lean solvent stream 126 and semi-lean solvent stream 127 may be performed with a single, or two independent cooling devices that employ water, air, or other refrigerants as coolants. The cooling devices may thereby be energetically coupled or independent from the gas purification process. Although the coolers 112 and 114 are preferably side coolers coupled to the absorber, various alternative configurations are also contemplated, including multiple side coolers or a single side cooler with two independent channels for the two solvent streams. In general, the size, nature of coolant, and cooling capacity are not limiting to the coolers, so long as the cooled mixed solvent stream is cooler than the mixed solvent stream, and so long as the cooled lean solvent stream is cooler than the lean solvent stream. Contemplated coolers preferably reduce the temperature of the lean solvent stream and the mixed solvent stream more than 10° C., more preferably more than 25° C., and most preferably more than 50° C. It is further contemplated that the connecting element 173 need not be limited to a line, but may have various sizes, shapes, or forms so long as the connecting element feeds the cooled mixed solvent into the absorber. For example, contemplated connecting elements include a simple opening, a single, or multiple pipes or lines which may or may not be flexible, or a flange or other mounting means.

In still further alternative aspects of the inventive subject matter, the semi-rich solvent stream need not be limited to a single semi-rich solvent stream with a carbon dioxide loading of greater than 0.3, but may include multiple semi-rich solvent streams with identical or different carbon dioxide loading, so long as at least part of the semi-rich solvent stream is mixed with at least part of the semi-lean solvent stream. For example, appropriate semi-rich solvent streams may be drawn off the absorber at different positions that may or may not have the same vertical distance from the top of the absorber.

With respect to the solvent flow control element 170 it is contemplated that various alternative devices other than a static mixer with two inlet ports and one outlet port are also appropriate, so long as at least part of the semi-lean solvent stream is mixed with at least part of the semi-rich solvent stream. For example, one or more than one simple T- or Y-shaped pipe connectors may already be sufficient, especially where portions of the cooler 112 may help in mixing the two solvent streams. Where it is desirable to control the ratio of the mixture of the two solvent streams, additional elements, including a flow control valve is contemplated. It should be especially appreciated that a configuration where a semi-lean solvent stream is mixed with a semi-rich solvent stream to form a mixed solvent stream, and where the mixed solvent stream is cooled before entering an absorber reduces the thermal energy required to remove carbon dioxide from a flue gas. Further advantages of this design include an increase in solvent capacity, and a reduction of the solvent circulation rate.

Figure 2:
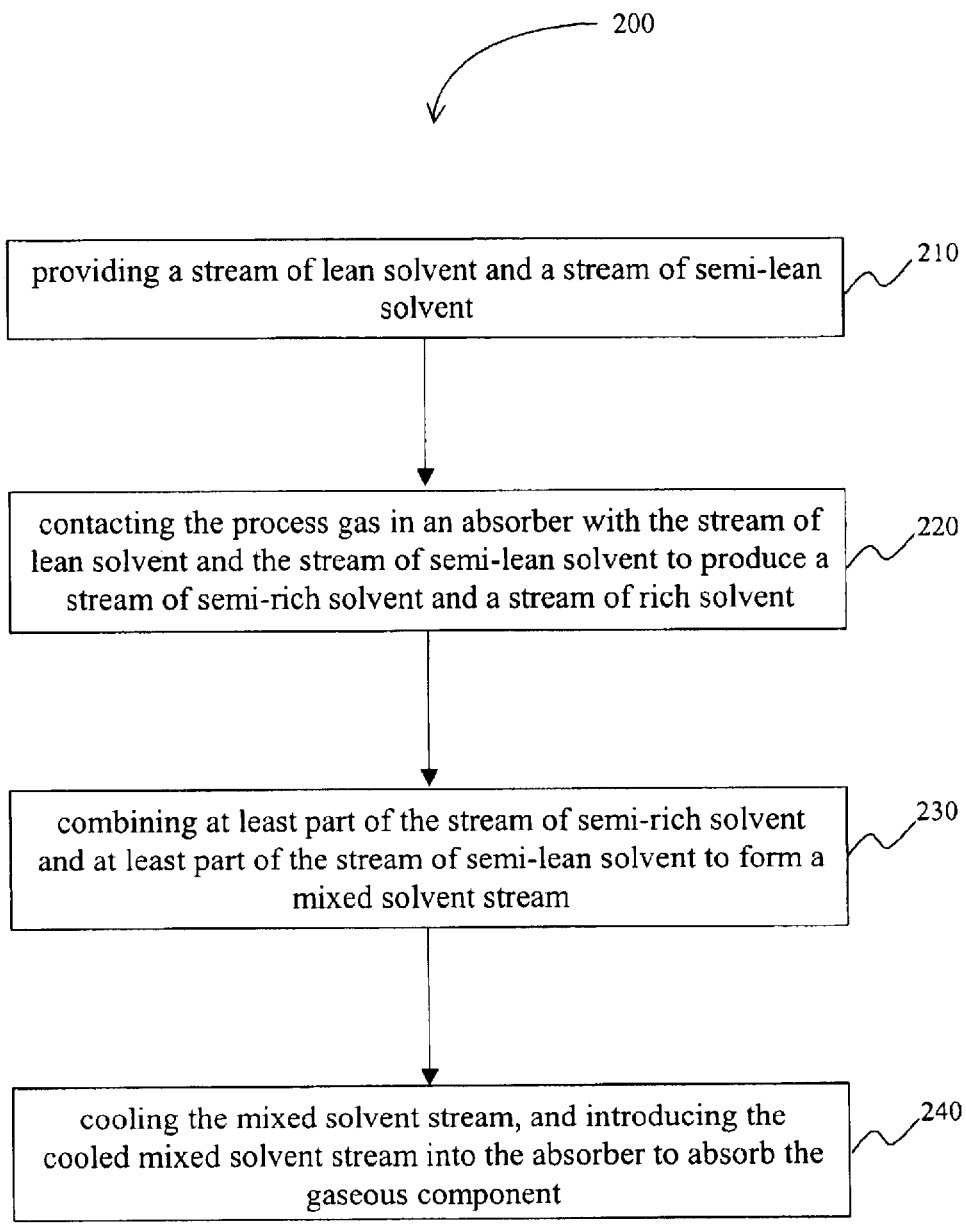
FIG. 2 is a flow diagram of an improved process for $CO_2$ removal from a flue gas according to the inventive subject matter.

In FIG. 2, a flow diagram 200 depicts a method of removing a gaseous component from a process gas, wherein in the first step 210 a stream of lean solvent and a stream of semi-lean solvent are provided. In a second step 220, the process gas is contacted in an absorber with the stream of lean solvent and the stream of semi-lean solvent to produce a stream of semi-rich solvent and a stream of rich solvent, and a subsequent step 230 at least part of the stream of semi-rich solvent and at least part of the stream of semi-lean solvent are combined to form a mixed solvent stream. In a further step 240 the mixed solvent stream is cooled and the cooled mixed solvent stream is introduced into the absorber to absorb the gaseous component.

In a preferred embodiment the stream of lean solvent and the stream of semi-lean solvent both comprise MEA as a solvent, and are both produced by a regenerator. The process gas is a low-pressure flue gas from a combustion turbine with a pressure of less than 20 psia when fed into the absorber, and the gaseous component in the flue gas is carbon dioxide at a concentration of typically less than 20 mole %, and more typically less than 10 mole %. The low pressure flue gas (i.e. less than 10 psia when fed into the absorber) is contacted in an absorber with a counter current stream of lean solvent having a carbon dioxide loading of about 0.2, and a stream of semi-lean solvent having a carbon dioxide loading of about 0.4, to produce a stream of semi-rich solvent having a carbon dioxide loading of more than 0.3 and a stream of rich solvent having a carbon dioxide loading of about 0.5. Subsequently, the stream of semi-rich solvent and the stream of semi-lean solvent are combined in a static mixer to form a mixed solvent stream. Next, the mixed solvent stream is cooled by a side cooler to form a cooled mixed solvent stream, and the cooled mixed solvent stream is then fed into the absorber.

With respect to identical components between the preferred method of FIG. 2 and preferred components of FIG. 1, the same considerations as previously discussed apply.

Thus, specific embodiments and applications of improved methods and apparatus for the removal of a gaseous component from a process gas have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A recovery plant that recovers a gaseous component from a process gas having a pressure of between about 2 psig and less than 20 psia, comprising:

an absorber employing a lean solvent and a semi-lean solvent that absorb the gaseous component from the process gas, thereby producing a rich solvent, a semi-rich solvent, and a lean process gas, wherein both of the lean solvent and the semi-lean solvent are produced by a regenerator;

wherein the regenerator is fluidly coupled to the absorber, wherein the regenerator receives at least part of the rich solvent and extracts the gaseous component from the rich solvent, thereby regenerating the lean solvent and the semi-lean solvent;

a solvent flow control element, fluidly coupled to the absorber, that combines at least part of the semi-rich solvent with at least part of the semi-lean solvent to form a mixed solvent;

an optional cooler fluidly coupled to the absorber, the cooler cooling the mixed solvent; and a connecting element that feeds the cooled mixed solvent into the absorber.

2. The recovery plant of claim 1 wherein the process gas comprises a flue gas from a combustion turbine.

3. The recovery plant of claim 1 wherein the gaseous component is carbon dioxide.

4. The recovery plant of claim 3 wherein the carbon dioxide in the process gas has a concentration of greater than 10 mole %.

5. The recovery plant of claim 3 wherein the carbon dioxide in the process gas has a concentration of greater than 5 mole %.

6. The recovery plant of claim 3 wherein the carbon dioxide in the process gas has a concentration of greater than 2 mole %.

7. The recovery plant of claim 1 wherein the solvent comprises a chemical solvent.

8. The recovery plant of claim 7 wherein the chemical solvent comprises at least one of an organic amine and a mixed amine.

9. The recovery plant of claim 7 wherein the chemical solvent is selected from the group consisting of monoethanolamine, diethanolamine, diglycolamine, and methyldiethanolamine.

10. The recovery plant of claim 7 wherein the chemical solvent is monoethanolamine.

11. The recovery plant of claim 1 wherein the rich solvent is fed to the top of the regenerator in a single rich solvent stream.

12. The recovery plant of claim 1 wherein the cooler has a capacity sufficient to reduce the temperature of the mixed solvent more than 50° C.

13. The recovery plant of claim 1 wherein the cooler has a capacity sufficient to reduce the temperature of the mixed solvent more than 10° C.

* * * * *